US008947894B2

(12) United States Patent
Zhang et al.

(10) Patent No.: US 8,947,894 B2
(45) Date of Patent: Feb. 3, 2015

(54) SWITCHED MODE POWER SUPPLY INCLUDING A FLYBACK CONVERTER WITH PRIMARY SIDE CONTROL

(71) Applicant: Infineon Technologies Austria AG, Villach (AT)

(72) Inventors: Guoxing Zhang, Singapore (SG); Mingping Mao, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 85 days.

(21) Appl. No.: 13/857,642

(22) Filed: Apr. 5, 2013

(65) Prior Publication Data
US 2014/0301116 A1 Oct. 9, 2014

(51) Int. Cl.
H02M 3/335 (2006.01)
H02M 3/24 (2006.01)

(52) U.S. Cl.
CPC ................................ H02M 3/33523 (2013.01)
USPC .......................... 363/21.15; 363/21.12; 363/97

(58) Field of Classification Search
USPC ............... 363/20, 21.01, 21.12, 21.13, 95, 97
See application file for complete search history.

(56) References Cited

U.S. PATENT DOCUMENTS

| 7,433,211 | B1 * | 10/2008 | Collmeyer et al. | 363/21.13 |
|---|---|---|---|---|
| 7,548,438 | B1 * | 6/2009 | Collmeyer et al. | 363/21.13 |
| 8,008,903 | B2 * | 8/2011 | Park et al. | 323/288 |
| 8,279,631 | B2 * | 10/2012 | Yang | 363/20 |
| 8,379,413 | B2 * | 2/2013 | Ren et al. | 363/21.12 |
| 8,811,045 | B2 * | 8/2014 | Ren et al. | 363/21.16 |
| 2004/0264216 | A1 * | 12/2004 | Mednik et al. | 363/18 |
| 2010/0053998 | A1 * | 3/2010 | Shimada | 363/21.01 |
| 2011/0103102 | A1 * | 5/2011 | Chiang et al. | 363/21.13 |
| 2011/0255313 | A1 * | 10/2011 | Park et al. | 363/21.17 |
| 2011/0261596 | A1 * | 10/2011 | Zong et al. | 363/21.13 |
| 2012/0250366 | A1 * | 10/2012 | Wang et al. | 363/21.15 |
| 2012/0250367 | A1 * | 10/2012 | Desimone et al. | 363/21.17 |
| 2014/0049231 | A1 * | 2/2014 | Takata | 323/207 |
| 2014/0063867 | A1 * | 3/2014 | Djenguerian et al. | 363/21.17 |
| 2014/0204619 | A1 * | 7/2014 | Telefus | 363/21.01 |

OTHER PUBLICATIONS

Castillejo, J.I., et al., "Robust Control of an Ideal DCM/CCM Flyback Switching Converter," Proceedings of the $10^{th}$ Mediterranean Conference on Control and Automation—MED2002, Jul. 9-12, 2002, 7 pages, Lisbon, Portugal.

(Continued)

Primary Examiner — Timothy J Dole
Assistant Examiner — Ishrat Jamali
(74) Attorney, Agent, or Firm — Slater & Matsil, L.L.P.

(57) ABSTRACT

A method and apparatus for controlling a flyback converter are presented. The flyback converter includes a transformer, a semiconductor switch coupled to a primary winding of the transformer, a current measurement circuit coupled to the semiconductor switch, a diode coupled in series to a secondary winding of the transformer, and a controller. The controller is configured to receive a feedback voltage, a reference signal, and the measured primary current and generate a control signal for the semiconductor switch dependent on the feedback voltage, the reference signal, and the measured primary current. The semiconductor switch switches on and off cyclically in CCM operation.

20 Claims, 4 Drawing Sheets

(56) References Cited

OTHER PUBLICATIONS

Fairchild Semiconductor, "Design Guidelines for Quasi-Resonant Converters Using FSCQ-series Fairchild Power Switch (FPS™)," Application Note AN4146, Rev. 1.0.1, 2005, 24 pages.

Infineon Technologies, "Determine the Switching Frequency of Quasi-Resonant Flyback Converters Designed with ICE2QS01 (ANPS0004)," Power Management & Supply, Application Note AN-ICE2QS01, V1.1, Aug. 15, 2011, 12 pages.

* cited by examiner (a)

(b)

SWITCHED MODE POWER SUPPLY INCLUDING A FLYBACK CONVERTER WITH PRIMARY SIDE CONTROL

TECHNICAL FIELD

The present disclosure relates to a switched mode power supply including a flyback converter with a primary side control.

BACKGROUND

Switched-mode power supplies (SMPS) are commonly used and increasingly replacing "classical" power supplies composed of a transformer and a linear voltage regulator. SMPS use switching power converters to convert one voltage (e.g., an AC line voltage or a 13.8 V battery voltage) into another voltage, which may be used as supply voltage for an electric device or an electronic circuit. Many different switching power converter topologies are known in the field, such as buck converters, boost converters, Ĉuk converters, flyback converters, etc.

For safety reasons, it is desirable for the output of the power converter circuit to include galvanic isolation from the input circuit (connected to the utility power grid). The isolation averts possible current draw from the input source in the event of a short circuit on the output and may be a design requirement in many applications. Usually, optocouplers are used to galvanically isolate a feedback signal representing the regulated output voltage from the input circuit of the power converter circuit. The power conversion is accomplished by using a transformer. Transmitting feedback signals via optocouplers to ensure galvanic isolation often entails a comparably complicated feedback circuit.

Another design goal for the power conversion from the incoming AC line power to the regulated DC output current may be accomplished through a single conversion step controlled by one switching power semiconductor. A one-step conversion maximizes circuit efficiency, reduces cost, and raises overall reliability. Switching power conversion in the circuit design is necessary but not sufficient to satisfy the one-step conversion requirement while capitalizing on the inherent efficiency.

There is a need for a SMPS circuit that provides a regulated output voltage while not requiring any feedback signals to be tapped at the voltage output. Thus, optocouplers or similar components, which are usually employed for transmitting the current feedback signal back to the input circuit while providing a galvanic isolation, can be disposed of.

SUMMARY OF THE INVENTION

A method for controlling a flyback converter is described. The flyback converter may include a transformer that has a primary winding, a secondary winding, and an auxiliary winding, wherein the primary winding is operably carrying a primary current, the secondary winding is operably carrying a secondary current, and the auxiliary winding is operably providing a feedback voltage. The flyback converter may further include a semiconductor switch that is coupled in series to the primary winding for switching a primary current in accordance with a control signal, a current measurement circuit that is coupled to the semiconductor switch or the transformer for measuring the primary current, and a diode that is coupled in series to the secondary winding for rectifying the secondary current. Moreover, the flyback converter may include a controller for receiving the feedback voltage, a reference signal, and the measured primary current and is configured to generate the control signal for the semiconductor switch dependent from the feedback voltage, the reference signal, and the measured primary current. Thereby, the semiconductor switch switches on and off cyclically.

In accordance with a first aspect of the invention, the method comprises regularly interrupting the switching operation such that the secondary current drops to zero while the semiconductor switch is off, and sampling the feedback voltage at the time instant the secondary current reaches zero, thereby obtaining a first sampled value. The switching operation is continued and the feedback voltage is sampled at the time instant the control signal indicates a switching operation to switch on the semiconductor switch, thereby obtaining a second sampled value. Furthermore, measured primary current is sampled at the time instant the semiconductor switch has switched on, thereby obtaining a third sampled value. Finally, the reference signal is adjusted dependent on the first, the second, and the third sampled values.

Further, an electronic controller device for controlling the flyback converter is described. According to another aspect of the invention, the electronic controller device includes a controller that receives the feedback voltage, a reference signal, and the measured primary current and is configured to generate the control signal for the semiconductor switch dependent on the feedback voltage, the reference signal, and the measured primary current, wherein the semiconductor switch is switched on and off cyclically in CCM operation. The electronic controller device further includes a compensation circuit that receives the reference signal and is configured to regularly interrupt the switching operation such that the secondary current drops to zero while the semiconductor switch is off. The compensation circuit is further configured to sample the feedback voltage at the time instant the secondary current reaches zero, thereby obtaining a first sampled value. Furthermore, the compensation circuit is configured to resume the switching operation and to sample the feedback voltage at the time instant the control signal indicates to switch the semiconductor switch on, thereby obtaining a second sampled value. The compensation circuit is further configured to sample the measured primary current at the time instant the semiconductor switch has switched on, thereby obtaining a third sampled value. Moreover, the reference signal is adjusted dependent on the first, the second, and the third sampled values downstream of the controller.

BRIEF DESCRIPTION OF THE DRAWINGS

The invention can be better understood with reference to the following drawings and description. The components in the figures are not necessarily to scale, instead, emphasis is placed upon illustrating the principles of the invention. Moreover, in the figures, like reference numerals designate corresponding parts. In the drawings.

DETAILED DESCRIPTION OF ILLUSTRATIVE EMBODIMENTS

Figure 1:
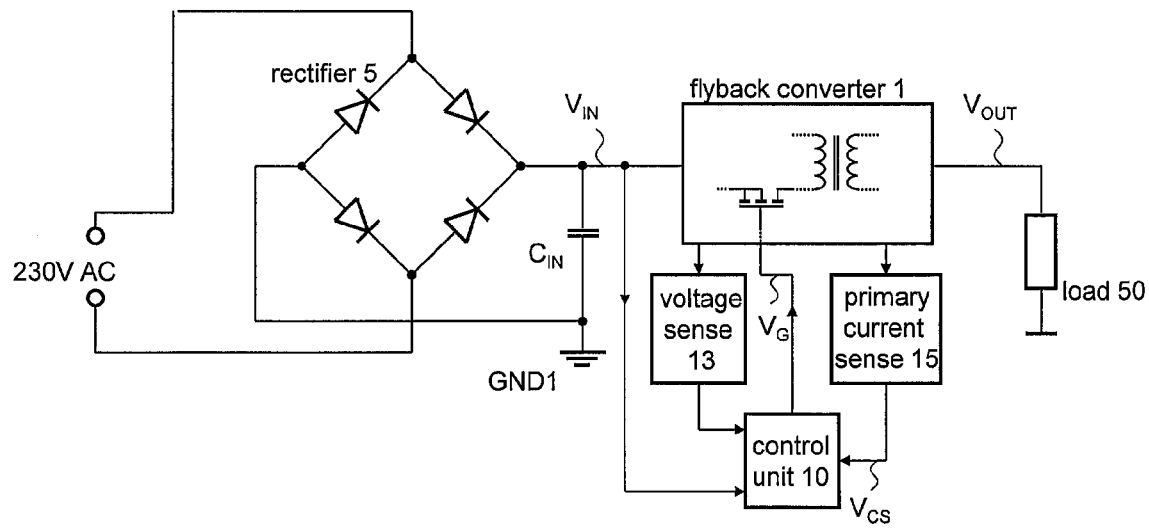
FIG. 1 illustrates the basic structure of a switched mode power supply (SMPS) circuit arrangement using a flyback converter topology and including output voltage control.

FIG. 1 illustrates the basic structure of a switched mode power supply (SMPS) circuit arrangement in accordance to one example of the present invention. The circuit arrangement comprises, as a switching power converter, a flyback converter 1 which comprises a primary side and a secondary side which are galvanically isolated by a transformer having a primary winding $L_P$ and a secondary winding $L_S$ (see also FIG. 2). The primary winding $L_P$ has $N_P$ turns and the secondary winding has $N_S$ turns.

The primary winding $L_P$ of a flyback converter 1 is coupled to a rectifier 5 configured to rectify an alternating line voltage supplied by, for example, the power grid.

The secondary winding $L_S$ of the flyback converter 1 is coupled to a load, i.e., the LED device 50, for supplying output power thereto. The flyback converter 1 further comprises a power semiconductor switch $T_1$ for controlling the current flow through the primary winding $L_P$ (denoted as primary current $i_P$). That is, the semiconductor switch is configured to switch the primary current $i_P$ on and off in accordance with a respective control signal. The circuit arrangement further comprises a current sense unit 15 (primary current sense) that provides a current sense signal $V_{CS}$ representing the primary current $i_P$ through the primary winding $L_P$. The current sense unit 15 may include, for example, a shunt resistor (cf. resistor $R_{CS}$ in FIG. 2) connected in series to the primary winding $L_P$, and the voltage drop across that shunt resistor represents the primary current $i_P$. The circuit arrangement further comprises a control unit 10 that generates the control signal $V_G$ supplied to the semiconductor switch $T_1$ so as to switch it on and off in accordance with this control signal $V_G$. The semiconductor switch $T_1$ may be, for example, a MOS field effect transistor (MOSFET). In this case the control signal $V_G$ may be the gate voltage or the gate current applied to the MOS transistor.

Generally, control unit 10 controls the switching operation of the flyback converter 1. In the present example, the control unit 10 is configured to control the flyback converter 1 such that it operates in a quasi-resonant (i.e., self-oscillating) mode. The control unit 10 may further be configured to compare the current sense signal $V_{CS}$ with a reference signal. The control signal $V_G$, which controls the switching state of the semiconductor switch $T_1$, is set to switch the primary current $i_P$ off when the primary current sense signal $V_{CS}$ equals or exceeds the reference signal. In quasi-resonant mode the semiconductor switch $T_1$ is, for example, switched on when the voltage across the switch $T_1$ is at a (local) minimum. For this purpose, the circuit arrangement may comprise a voltage sense unit 13 for directly or indirectly monitoring the voltage drop across the semiconductor switch during the off-time of the switch in order to allow for detecting the time instant when the voltage is at the minimum. Thus, the switching losses and the electromagnetic emissions are minimized.

The circuit of FIG. 1 may be a multi-mode switching power converter with primary side (only) control. "Primary Side Control" means that the control unit 10 is capable of regulating the output voltage thereby using only (measured) signals available on the primary side of the transformer included in the flyback converter 1. Therefore, no signal has to be measured at the secondary side and transmitted (via a galvanic isolation) to the controller. An additional galvanic isolation (usually provided by optocouplers in known SMPS) in the feedback loop is thus not necessary. Multi-mode means that the control unit 10 is configured to operate in different modes such as CCM at high loads, quasi-resonant DCM at medium and low loads, and burst mode at very low loads. The present description, however, mainly deals with CCM operation of the control unit 10. Multi-mode control units for use in SMPS are as such known in the field and thus not further discussed herein.

Figure 2:
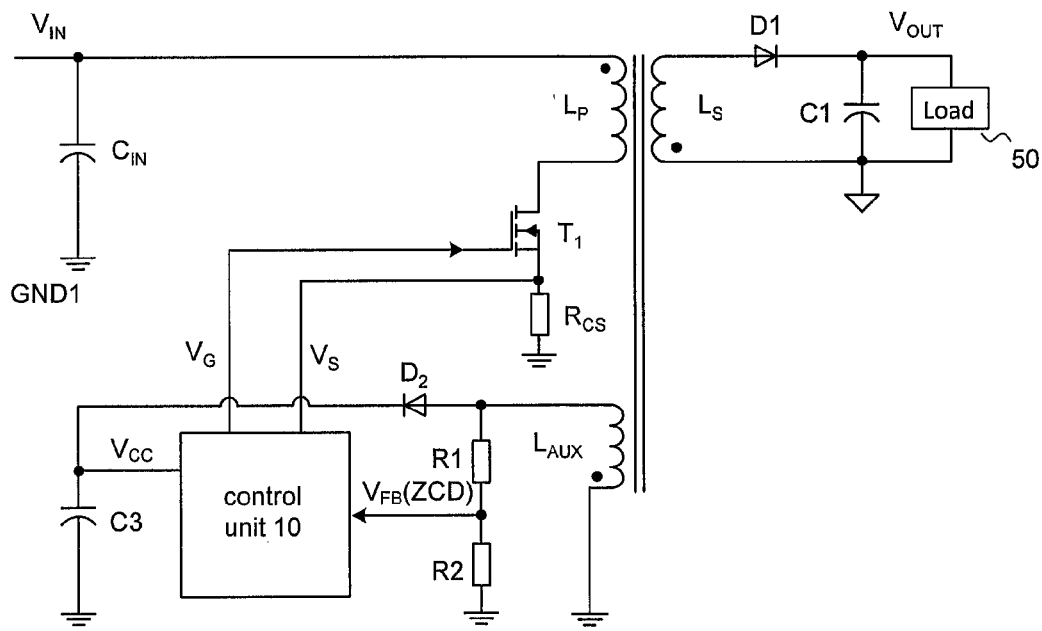
FIG. 2 illustrates the example of FIG. 1 in more detail.

FIG. 2 illustrates one exemplary implementation of the basic structure of FIG. 1 in more detail. The output voltage supplied to the load 50 is provided by a buffer capacitor $C_1$, output capacitor, or $C_{OUT}$) which is coupled parallel to a series circuit including the secondary winding $L_S$ of the transformer and the flyback diode $D_1$. Energy is transferred from the primary side to the secondary side of the transformer in the time intervals during which the primary current $i_P$ is switched off. During the same time interval, the buffer capacitor $C_1$ is charged via the flyback diode $D_1$ by the induced current flowing through the secondary winding $L_S$.

The primary winding $L_P$ is connected between an output of the rectifier 5 that provides the rectified line voltage $V_{IN}$ and the semiconductor switch $T_1$ which controls the current flow (primary current $i_P$) through the primary winding $L_P$. In the present example, the semiconductor switch $T_1$ is a MOSFET coupled between the primary winding $L_P$ and the ground terminal providing ground potential GND1. A current sense resistor $R_{CS}$ (also referred to as shunt resistor) may be connected between the source terminal of the MOSFET $T_1$ and the ground terminal such that the voltage drop $V_{CS}$ across the current sense resistor $R_{CS}$ represents the primary current $i_P$. It should be noted that the current sense resistor $R_{CS}$ is just one exemplary implementation of the current sense unit 15 illustrated in FIG. 1. Any other known current measurement method and related circuits are applicable as well. The voltage drop $V_{CS}$ across the current sense resistor $R_{CS}$ is provided as a current sense signal to the control unit 10 which generates a gate signal $V_G$ supplied to the control terminal of the semiconductor switch (i.e., the gate electrode in the case of a MOSFET) for controlling the switching state thereof.

When the semiconductor switch $T_1$ is switched on, the primary current $i_P$ starts to rise and the energy E stored in the primary winding $L_P$ increases. Since the flyback diode $D_1$ is reverse biased during this phase of "charging" the inductance of the primary winding $L_P$, the primary winding $L_P$ behaves like a singular inductor and the energy E stored in the primary winding equals $E=L_P \cdot i_P^2/2$. When the primary current $i_P$ is switched off by the semiconductor switch $T_1$, the flyback diode $D_1$ becomes forward biased and the energy E is transferred to the secondary winding $L_S$, whereby the secondary current $i_S$ resulting from the voltage induced in the secondary winding $L_S$ charges the output capacitor $C_{OUT}$. The operating principle of the control unit 10, according to which time instants, is determined when the semiconductor switch $T_1$ switches on and off and will be explained later. However, the design of quasi-resonant flyback converters is well known in the art (see, e.g., Fairchild Semiconductor, "Design Guidelines for Quasi-Resonant Converters Using FSCQ-series Fairchild Power Switch," in AN4146).

For detecting the time instances when to switch the primary current on, an auxiliary winding $L_{AUX}$ (having $N_{AUX}$ turns) may be magnetically coupled to the primary winding $L_P$. A first terminal of the auxiliary winding $L_{AUX}$ is coupled to the ground terminal GND1 whereas a second terminal of the auxiliary winding $L_{AUX}$ may be coupled to the control unit 10 via a resistor $R_1$. Actually, a fraction of the voltage across the auxiliary winding $L_{AUX}$ is supplied to the control circuit 10 via the voltage divider composed of the resistor $R_1$ and a further resistor $R_2$ coupled in series to resistor $R_1$. The fractional voltage is denoted as $V_{FB}$ in FIG. 2. The series circuit of resistors $R_1$ and $R_2$ is coupled in parallel to the auxiliary winding $L_{AUX}$ and the middle tap of the voltage divider is connected to the control unit 10. The resistors $R_1$ and $R_2$, together with the auxiliary winding $L_{AUX}$, may be regarded as the voltage sense unit 13 illustrated in the general example of FIG. 1.

The auxiliary winding $L_{AUX}$ may further be used for providing a supply voltage $V_{CC}$ to the control unit 10 by means of a bootstrap supply circuit 12. When the primary current $i_P$ is switched off, the voltage across the auxiliary winding $L_{AUX}$ rises such that the bootstrap diode $D_2$ is forward-biased and thus allows for charging the bootstrap capacitor $C_3$. However, such bootstrap supply circuit is well known in present flyback converters and will not be further discussed here.

Flyback converters can be operated in continuous current mode (CCM, in which the secondary current does not drop to zero) and discontinuous current mode (DCM, in which the secondary current drops to zero and remains zero for a finite time). A special case of DCM is the limiting case between DCM and CCM (i.e., the transition between CCM and DCM) and sometimes referred to as critical conduction mode (CrCM, in which the secondary current drops to zero for only a very short time). The basic principles of controlling flyback converters in DCM and CCM are well known in the art and thus not explained here in more detail (see, e.g., J. I. Castillejo, M. García-Sanz, "Robust Control of an Ideal DCM/CCM Flyback Converter," Proc. of the 10th Mediterranean Conference on Control and Automation (MED2002), Lisbon, Portugal, Jul. 9-12, 2002). In order to control the output voltage $V_{OUT}$ or the output current of the power converter, a respective feedback signal (representing the output voltage or current, respectively) may be fed back to the control unit 10. In order to provide a proper galvanic isolation, optocouplers are usually used in the feedback loop. To simplify the overall switched mode power supply (SMPS) circuit, so called "primary side control" concepts have been developed, according to which the output voltage to be regulated is estimated using measurements accomplished solely on the primary side of the flyback converter. Particularly, the secondary current $i_S$ and the output voltage $V_{OUT}$ may be observed (i.e., estimated) from the measured values of the primary current $i_P$ and the feedback voltage $V_{FB}$ obtained from the auxiliary winding $L_{AUX}$.

Figure 3:
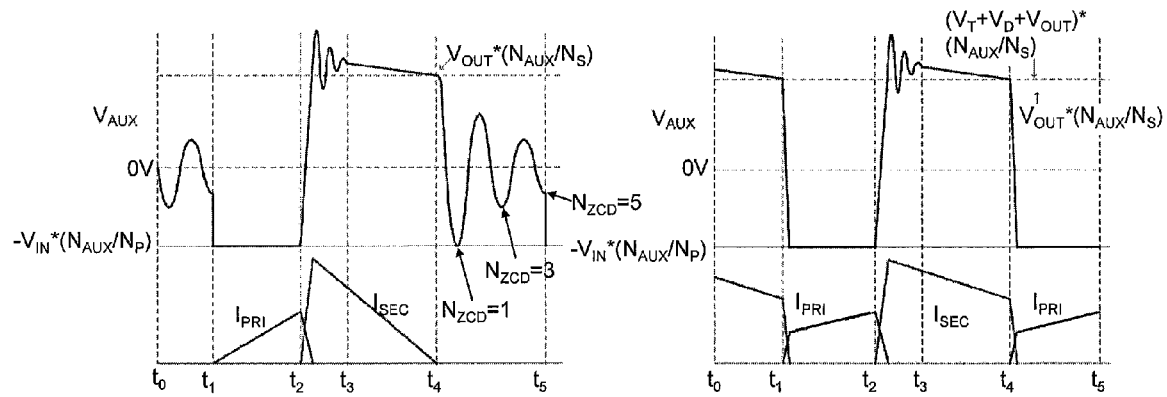
FIG. 3 is a timing diagram illustrating the operation of a flyback converter in general.

FIG. 3 illustrates timing diagrams of the voltage $V_{AUX}$ across the auxiliary winding $L_{AUX}$ and the primary current $i_P$ as well as the secondary current $i_S$. The left diagram of FIG. 3 illustrates the SMPS operating in discontinuous current mode (DCM), whereas the right diagram of FIG. 3 illustrates the SMPS operating in continuous current mode (CCM). The timing diagrams are discussed in more detail below. In the left diagram of FIG. 3, the waveforms between the time instant $t_1$ and the time instant $t_5$ (when the semiconductor switch $T_1$ switches on after it has been switched off at time instant $t_2$) are continuously repeated during operation in DCM. At the time instant $t_1$, the semiconductor switch is switched on and the primary current $i_P$ starts ramping up until a maximum current is reached at time instant $t_2$, when the semiconductor switch $T_1$ is switched off again. As a result, the primary current $i_P$ quickly drops to zero, while the secondary current (almost immediately) rises to its maximum value and then ramping down until it reaches zero amperes at time instant $t_4$. When the semiconductor switch $T_1$ is in its on-state (i.e., switched on) between the time instants $t_1$ and $t_2$, the voltage $V_{AUX}$ across the auxiliary winding is almost zero. When the semiconductor switch $T_1$ is switched off at time $t_2$ the voltage $V_{AUX}$ steeply rises up to a maximum voltage. Some ringing of the voltage $V_{AUX}$ may be observed between the time instants $t_2$ and $t_3$ (i.e., during a settling time), and between the time instants $t_3$ and $t_4$ (when the secondary current has dropped to zero) the voltage $V_{AUX}$ drops to the value $V_{OUT} N_{AUX}/N_S$, that is $$V_{OUT}(t_4) = V_{AUX} \cdot N_S/N_{AUX} \text{ (in DCM)} \qquad (1).$$

Equation (1) is valid for DCM only, in which the time instant $t_4$ is the time instant when the secondary current drops to zero. During the time interval between the time instants $t_4$ and $t_5$, the voltage $V_{AUX}$ is ringing again and—when operating in quasiresonant mode—the semiconductor switch $T_1$ is switched on again when the voltage $V_{AUX}$ reaches a (local) minimum, which is, in the present example, at time instant $t_5$. At the time $t_5$ the cycle starts over.

When operating in CCM, the situation is somewhat different as illustrated in the right diagram of FIG. 3. As the secondary current $i_S$ never falls to zero, the forward voltage $V_D$ across the flyback diode $D_1$, as well as the voltage $V_T$ due to the (ohmic) resistance of the secondary winding $L_S$, adds to the output voltage $V_{OUT}$ in above-mentioned equation (1). That is, at time instant $t_4$ (when the semiconductor switch is switched on again) the voltage $V_{AUX}$ can be equated as:

$$V_{AUX}(t_4) = (V_{OUT} + V_T + V_D) \cdot N_{AUX}/N_S \text{ (in CCM)} \qquad (2).$$

The waveforms in the left diagram (DCM) and the right diagram (CCM) of FIG. 3 are essentially the same except that the semiconductor switch is switched on again before the secondary current $i_S$ has dropped to zero.

So when (hypothetically) using equation (1) to calculate the output voltage $V_{OUT}$ from the measured voltage $V_{AUX}$, the difference between the actual output voltage $V_{OUT}$ and the estimation $V_{AUX} \cdot N_S/N_{AUX}$ equates to (by combining equations (1) and (2)):

$$V_{AUX}(t_4) \cdot N_S/N_{AUX} - V_{OUT}(t_4) = (V_T + V_D) \qquad (3)$$

which is equivalent to:

$$V_{AUX}(t_4) - V_{OUT}(t_4) \cdot N_{AUX}/N_S = (V_T + V_D) N_{AUX}/N_S \qquad (4).$$

Equation (4) is valid not only at time instant $t_4$ but during the whole time interval between $t_3$ and $t_4$ in the right diagram of FIG. 3, which illustrates CCM operation. In this regard, it should be noted that the actual values of $V_T$ and $V_D$ may also be time-variant. As a consequence, a simple control unit which estimates the output voltage $V_{OUT}$ in accordance with equation (1) would actually make the output voltage by $V_T + V_D$ lower than expected. Moreover, the difference of equation (4) heavily depends on the actual output current as well as on temperature, diode characteristics, and PCB layout. Therefore, a precise output voltage regulation is difficult when using primary-side control.

One option would be to use a constant voltage offset so as to compensate for the mentioned (time-variant) offset $V_T + V_D$. However, this solves the above-mentioned problem only for a specific diode characteristic, a specific PCB layout, and within a very narrow temperature range and output current range. Obviously, a more sophisticated approach would be highly useful.

As discussed above, the problem of insufficient proportionality between the voltage $V_{AUX}$, which is observable at the auxiliary winding $L_{AUX}$, and the actual output voltage $V_{OUT}$ only occurs during continuous current mode (CCM, see right diagram of FIG. 3). Therefore, according to one aspect of the present invention, the control unit 10 is configured to insert one switching cycle (during CCM operation) in which the secondary current $i_S$ is allowed to drop to zero before switching on the primary current $i_P$. In other words, at least one DCM or CrCM switching cycle is inserted during CCM operation.

Figure 4:
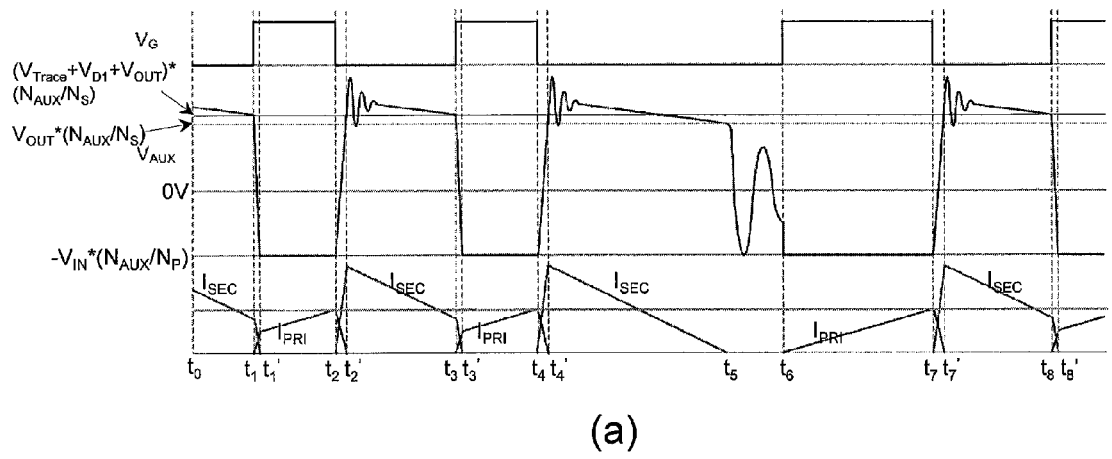
FIG. 4 is a timing diagram illustrating the operation of a flyback converter in accordance with one embodiment of the invention.
Figure 4:
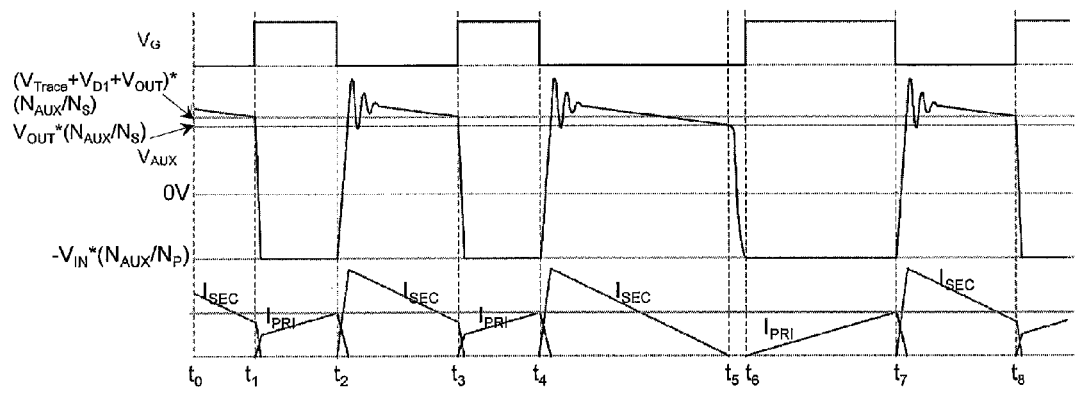

Inserting a single DCM switching cycle during CCM operation has only a negligible impact on the output voltage but allows for a precise measurement of the output voltage and current at the primary side of the flyback converter. The above-mentioned general concept is discussed in more detail below with reference to FIG. 4. Diagram (a) of FIG. 4 illustrates the insertion of a (longer) DCM cycle whereas diagram (b) illustrates a short DCM cycle of minimum length, i.e., a CrCM cycle. For further discussion, it should be noted that the time instants $t_0$ to $t_5$ in FIG. 3 do not correspond with the time instants $t_0$ to $t_5$ in FIG. 4.

Diagrams (a) and (b) of FIG. 4 are identical for times before the time instant $t_5$ when the secondary current $i_S$ reaches zero. For times before the time instant $t_4$ both diagrams illustrated a switching operation in continuous current mode (CCM) as already illustrated in the right diagram of FIG. 3. Both diagrams of FIG. 4 illustrate the control signal $V_G$ applied to semiconductor switch $T_1$ (top waveforms). In the present example, the control signal $V_G$ is a gate voltage and semiconductor switch $T_1$ is a MOS transistors. Furthermore, the corresponding voltage $V_{AUX}$ at the auxiliary winding $L_{AUX}$ (middle waveforms) and the resulting primary and secondary currents $i_P$ and $i_S$ (bottom waveforms) are illustrated. At the time instant $t_1$ the gate voltage $V_G$ switches from a low level to a high level thus activating the MOS transistor $T_1$ (i.e., switching it on). As a consequence, the secondary current $i_S$ almost immediately drops to zero (as the flyback diode $D_1$ is now reverse biased) while the primary current $i_P$ steeply rises to an initial value.

At time instant $t_1'$, the secondary current $i_S$ is zero and the primary current $i_P$ is at its initial value. After the time instant $t_1'$, the primary current further rises until it reaches its (predefined) maximum value at time instant $t_2$, at which the gate voltage $V_G$ is reset, again, to a low level thus deactivating the MOS transistor $T_1$ (i.e., switching it off). During the time interval from $t_1$ to $t_2$ the voltage $V_{AUX}$ is approximately $-V_{IN} \cdot N_{AUX}/N_P$. When the transistor $T_1$ is deactivated at time instant $t_2$, the primary current $i_P$ almost immediately drops to zero (as the transistor $T_1$ is now in its blocking state) while the secondary current $i_S$ steeply rises to an initial value.

At time instant $t_2'$, the primary current $i_P$ is zero and the secondary current $i_S$ is at its initial value. After the time instant $t_2'$ the secondary current almost constantly drops until it reaches its minimum value at time instant $t_3$, at which the gate voltage $V_G$ is set, again, to a high level thus re-activating the MOS transistor $T_1$ in the same manner as in time instant $t_1$, and cycle starts over. During the time interval from $t_2'$ to $t_3$ the voltage $V_{AUX}$ drops (after a short ringing during a settling time) from a maximum value to a minimum value $V_{AUX}(t_3)=(V_T+V_D \pm V_{OUT}) \cdot N_{AUX}/N_S$ at time instant $t_3$ (cf. equation (2)), which is higher than the "ideal" value of $V_{OUT} \cdot N_{AUX}/N_S$ (cf. equation (1)). During CCM the switching frequency $f_{SW}$ is fixed, so the time interval $t_3-t_1$ corresponds to the switching period $f_{SW}^{-1}$.

Between the time instants $t_3$ and $t_4$, the signals have the same waveform as between the time instants $t_1$ and $t_2$ (while the semiconductor switch $T_1$ is on). At the time instant $t_4$ the semiconductor switch $T_1$ is switched off thus interrupting the primary current flow through the primary winding $L_P$ and initiating the secondary current flow through the secondary winding $L_S$. The primary current $i_P$ drops to zero and the secondary $i_S$ current rises steeply to its initial value between the time instants $t_4$ and $t_4'$ in the same manner as in the time interval between $t_2$ and $t_2'$. However, different from the previous period during which the semiconductor switch T1 was off, the secondary current is now allowed to drop continuously (at a substantially constant rate) until it reaches zero at time instant $t_5$. During the time interval from $t_4'$ to $t_5$, the voltage $V_{AUX}$ drops (after a short ringing during a settling time) from a maximum value to a minimum value $V_{AUX}(t_5)=(V_{OUT}) \cdot N_{AUX}/N_S$ at time instant $t_5$. As the secondary current $i_S$ is allowed to drop to zero, the cycle between $t_3$ to $t_6$ (i.e., when the semiconductor switch is reactivated) is a (single) DCM cycle while the previous cycles (e.g., between $t_1$ and $t_3$) and the subsequent cycles are CCM cycles, during which the secondary current $i_P$ does not drop to zero. Starting from time instant $t_6$ the primary current $i_P$ starts continuously increasing from zero to its maximum value and CCM operation is continued.

The only difference between diagram (a) and the diagram (b) of FIG. 4 is the duration of the time between $t_5$ and $t_6$ during which the primary and the secondary current $i_P$ and $i_S$, respectively, are zero. In this time period, the voltage $V_{AUX}$ is oscillating and the switching time $t_6$ is chosen at a local minimum (also referred to as "valley point") of the oscillation. When switching at such local minima, the flyback converter is operated in "quasi-resonant" mode. Quasi-resonant switching as such is known in the art (see, e.g., Infineon Technologies Asia Pacific, "Determine the Switching Frequency of Quasi-Resonant Flyback Converters Designed with ICE2QS01," Application Note AN-ICE2QS01, Aug. 15, 2011) and thus not further discussed herein. From FIG. 4, one can see that when inserting a single DCM cycle during CCM operation, the voltage $V_{AUX}$ is directly proportional to the output voltage $V_{OUT}$ (the proportionality factor being the turn ratio $N_S/N_{AUX}$) at the time instant ($t_5$ in FIG. 4) when the secondary current reaches zero. Thus, inserting a DCM cycle allows for a precise output voltage measurement by monitoring the voltage $V_{AUX}$ across the auxiliary winding $L_{AUX}$ which is galvanically isolated from the secondary side without the need for an optocoupler.

From the diagrams in FIG. 4 and the equations (1) to (4) one can conclude that the offset voltage $V_T+V_D$ due to the diode forward voltage $V_D$ (of diode $D_1$, see FIG. 3) and the voltage $V_T$ due to the overall line resistance of the secondary side equates to:

$$(V_{AUX}(t_8) - V_{AUX}(t_5)) \cdot N_S/N_{AUX} = V_T + V_D = V_{OFFSET} \quad (5)$$

wherein the time instant $t_8$ is the very moment when the control signal $V_G$ (i.e., the gate voltage) changes from low to high, i.e., immediately before switching on the semiconductor switch $T_1$. It should be noted that $V_{AUX}(t_8)$ may be measured in any CCM cycle, wherein $V_{AUX}(t_1)=V_{AUX}(t_3)=V_{AUX}(t_8)$ as illustrated in FIG. 4 (both diagrams). The time instant $t_5$ is the very moment when the secondary current $i_S$ falls to zero in a DCM cycle. It should be noted that $V_{AUX}(t_5)$ may be measured in any DCM cycle, however, only a single DCM cycle is illustrated in each diagram of FIG. 4. From equation (5), it can be concluded that the offset voltage $V_{OFFSET}$ is derivable from measurements of the voltage $V_{AUX}$ at different time instants $t_5$ and $t_8$ wherein, as mentioned, $t_5$ represents any time instant during a DCM cycle when the secondary current reaches zero and $t_8$ represents any time instant during a CCM cycle immediately before the semiconductor switch $T_1$ is switched on. In order to determine the offset voltage $V_{OFFSET}$ in accordance with equation (5), the problem of how to detect the time instant $t_5$ (i.e., when the secondary current $i_S$ reaches zero) remains.

The time instant $t_5$ can be estimated as $t_5=t_6-N_{ZCD} \cdot \pi \cdot \mathrm{sqrt}(L_P \cdot C_{T1ds})$, where $L_P$ is the transformer primary inductance, $C_{T1ds}$ is the equivalent capacitance across $T_1$ drain and source pin, $N_{ZCD}$ is the number of half-periods of the oscillation elapsed before the quasi-resonant switching zero-crossing point, e.g., $N_{ZCD}=3$ for FIG. 4a, $N_{ZCD}=1$ for FIG. 4b. $N_{ZCD}$ will also be an odd number (see also FIG. 3). Quasi-resonant switching is known in the field (see, e.g., Infineon Technologies Asia Pacific, "Determine the Switching Frequency of Quasi-Resonant Flyback Converters Designed with ICE2QS01," Application Note AN-ICE2QS01, Aug. 15, 2011) and thus not further discussed herein. In order to obtain the sample value $V_{AUX}(t_5)$, the voltage $V_{AUX}$ can be continuously sampled and stored between the time instants $t_4$ and $t_6$. Then, at time instant $t_6$ the sample value for time instant $t_5$ may be taken from the memory. Also a delay-line providing a delay of $N_{ZCD} \cdot \pi \cdot \sqrt{L_P \cdot C_{T1ds}}$ could be used to delay the currently sampled value for the voltage $V_{AUX}$, so that at time $t_6$ the sample value for the time instant $t_5$ is still available at the delay line output.

For the following it is assumed that the offset voltage $V_T + V_D$ can be calculated as:

$$V_{OFFSET} = V_T + V_D = p \cdot i_S(t_8) \qquad (6)$$

wherein the factor p may vary over time. This offset appears at auxiliary winding $L_{AUX}$ as:

$$V_{COMP} = V_{OFFSET} \cdot N_{AUX}/N_S = (V_T + V_D) \cdot N_{AUX}/N_S = p \cdot i_S(t_8) \cdot N_{AUX}/N_S \qquad (7).$$

As the secondary current $i_S$ is not directly measured (remember that measurements at the secondary side are to be avoided to maintain galvanic isolation), the secondary current has to be derived from primary current measurements which are accomplished using the current sense resistor $R_{CS}$ (see FIG. 2) or, generally, the primary current sense unit 15 (see FIG. 1). During CCM operation, the secondary current $i_S$ can be derived from the primary current $i_P$ using the following equation:

$$i_S(t_8) = i_P(t_8') \cdot N_P/N_S \qquad (8)$$

wherein the time instant $t_8$ represents any time during a CCM cycle at which the semiconductor switch $T_1$ starts to switch on (i.e., the control signal $V_G$ changes from a low to a high level), and the time instant $t_8'$ represents any time during a CCM cycle at which the resulting primary current $i_P$ has risen to its initial value. Combining equations (6) and (8) yields:

$$V_{OFFSET} = V_T + V_D = p \cdot i_S(t_8) = p \cdot (N_P/N_S) \cdot i_P(t_8') = k \cdot i_P(t_8') \qquad (9).$$

That is, the offset voltage $V_T + V_D$ can be calculated from the primary current at the time the semiconductor switch $T_1$ has switched on. This offset appears at auxiliary winding $L_{AUX}$ as:

$$V_{COMP} = V_{OFFSET} \cdot N_{AUX}/N_S = (V_T + V_D) \cdot N_{AUX}/N_S = k \cdot i_P(t_8') \cdot N_{AUX}/N_S \qquad (10).$$

The proportionality factor k may be regularly determined by measuring the voltage $V_{AUX}$ at time instant $t_8$ in a CCM cycle and time instant $t_5$ in a DCM cycle (see FIG. 4). Combining equations (9) and (5) yields:

$$k = (V_T + V_D)/i_P(t_8') = (V_{AUX}(t_8) - V_{AUX}(t_5)) \cdot (N_S/N_{AUX})/i_P(t_8') \qquad (11).$$

Figure 5:
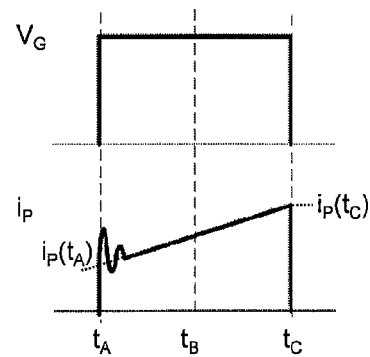
FIG. 5 illustrates a portion of the timing diagram of FIG. 4 in more detail.

To determine the proportionality factor k in accordance with equation (11), the primary current has to be sampled (measured) at a time instant immediately after the activation of the semiconductor switch $T_1$ (see FIG. 1). Oscillations of the primary current $i_P$, which may occur right after switching on the semiconductor switch $T_1$, may deteriorate the measured current value. This situation is illustrated in FIG. 5. A current measurement at a time instant $t_A$ (which corresponds to $t_1$, $t_3$, and $t_8$ in FIG. 4) is not reliable due to the oscillations. However, after the oscillations (which are a transient phenomenon) have decayed the primary current $i_P$ rises linearly which allows an extrapolation of the primary current $i_P(t_A)$ at time instant $t_A$. Assuming that further current values $i_P(t_B)$ and $i_P(t_C)$ are sampled after the oscillations have decayed, then the current $i_P(t_A)$ at time instant $t_A$ can be calculated as $$i_P(t_A) = 2 \cdot i_P(t_B) - i_P(t_C) \text{ for } t_B = (t_A + t_C)/2 \qquad (12)$$

that is, the sampling time $t_B$ is in the middle between the sampling times $t_A$ and $t_C$. This situation is illustrated in FIG. 5.

Figure 6:
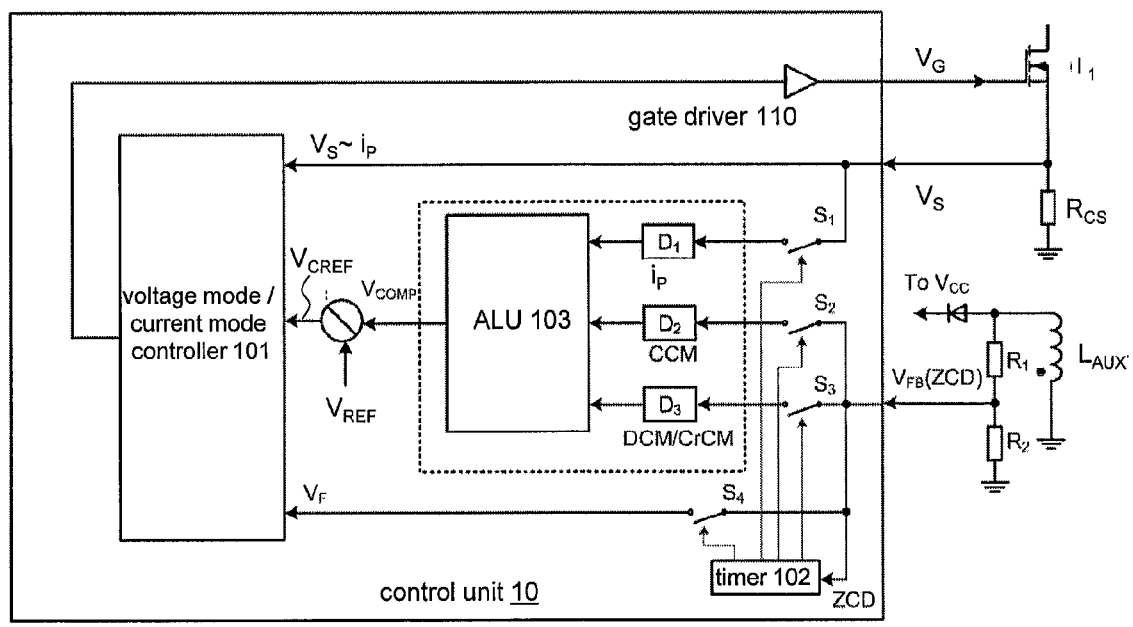
FIG. 6 illustrates a flyback converter including a control unit in accordance with one example of the invention.

An exemplary circuit representing the internal design of the control unit 10 (see FIGS. 1 and 2), which controls the switching operation of the flyback converter, is illustrated in FIG. 6. The illustrated embodiment is able to achieve a tight output voltage regulation during CCM operation for a flyback converter that requires no feedback signal from the secondary side (i.e., primary side control). The control unit 10 receives, as feedback voltage $V_{FB}$, a fraction $R_2/(R_1 + R_2)$ of the voltage $V_{AUX}$ tapped at the auxiliary winding $L_{AUX}$ and with a current sense signal $V_S$ tapped at the current sense resistor $R_{CS}$, which is coupled in series to the semiconductor switch $T_1$ and the primary winding $L_P$. Furthermore, the control unit 10 is configured to provide a control signal $V_G$ for the semiconductor switch $T_1$, i.e., a suitable gate voltage or gate current in the case of a MOSFET.

The control unit includes a voltage mode or a current mode controller 101 that is supplied with the signal $V_S$ representing the primary current $i_P$, the feedback voltage $V_{FB}$, and a (corrected) reference voltage $V_{CREF}$. The current mode controller 101 is configured to generate a binary signal from these input signals $V_S$, $V_{FB}$, and $V_{CREF}$, wherein the binary signal is transformed in a control signal $V_G$ that is suitable for switching the semiconductor switch $T_1$ on and off. The design and the operation of the voltage mode or a current mode controller 101 is as such known in the art and not further discussed here.

The corrected reference signal $V_{CREF}$ is derived from a reference signal $V_{REF}$ (which may be a constant voltage) which can be regarded as set point for the output voltage control. In order to compensate for the systematic error when measuring the output voltage $V_{OUT}$ in accordance with equation (1) in continuous current mode (CCM), the reference signal $V_{REF}$ is "corrected" by adding an offset in accordance with equation (10). That is, the corrected (adjusted) reference signal $V_{CREF}$ can be determined in accordance with the following equation:

$$V_{CREF} = V_{REF} + V_{COMP} = V_{REF} + k \cdot i_P(t_8') \cdot N_{AUX}/N_S \qquad (13)$$

wherein the factor k is determined in accordance with equation (11) during the inserted DCM cycles as discussed above with reference to FIG. 4. The time instants $t_5$, $t_8$, and $t_8'$ are those illustrated in FIG. 4 wherein $t_5$ represents the time instant in any DCM cycle in which the secondary current reaches zero, $t_8$ represents the time instant in any CCM cycle in which the semiconductor switch $T_1$ begins to switch on the primary current $i_P$, and $t_8'$ represents the time instant in any CCM cycle in which the semiconductor switch $T_1$ has finished the switching process of switching on the primary current $i_P$. The time instant $t_8$ can be detected as the time instant the control signal $V_G$ changes from a low to a high level (i.e., at a rising edge of the gate voltage $V_G$), whereas the time instant $t_8'$ can be detected as the time instant the voltage $V_{AUX}$ (and thus the feedback voltage $V_{FB}$) drops to $-V_{IN} \cdot N_{AUX}/N_P$ (i.e., at a falling edge of the feedback voltage $V_{FB}$).

A timer circuit 102 (timer) coordinates the insertion of DCM cycles during CCM operation and the sampling of the voltage $V_{AUX}$ and the primary current $i_P$ (i.e., of the measurement signal $V_S$) at different times. Moreover, the timer 102 triggers the insertion of DCM cycles and controls four switches $S_1$, $S_2$, $S_3$, and $S_4$. The feedback signal is connected to the current mode controller 101 via switch $S_4$. The switch $S_3$ allows the sampling of the feedback voltage $V_{FB}$ (which is a scaled version of voltage $V_{AUX}$) at time instant $t_5$ within a DCM cycle. The switch $S_2$ allows the sampling of the feedback voltage $V_{FB}$ at time instant $t_8$ within each CCM cycle, and the switch $S_1$ allows the sampling of the primary current (i.e., of the current sense signal $V_S$). The scaling factor $R_2/(R_1+R_2)$ of the feedback voltage may be considered in the subsequent signal processing. In fact, the voltage divider $R_1$, $R_2$ may be omitted so that $V_{FB}=V_{AUX}$.

The switch $S_4$ is closed during CCM operation and is opened regularly (periodically or from time to time) which triggers the insertion of a DCM cycle, as the feedback voltage $V_{FB}$ "seen" by the current mode controller 101 is zero when the switch $S_4$ is open. At time instants $t_5$, $t_8$, and $t_8'$ sampled values of $V_{FB}$ and $V_S$ are stored in the registers D3, D2, D1, which are coupled with the switches $S_3$, $S_2$, and $S_1$, respectively. As such, the switches $S_1$ to $S_3$ and the registers $D_1$ to $D_3$, operate as sample and hold circuits, wherein each sample and hold circuit is formed by a pair of switch and register, and the respective switches are controlled by the timer unit 102. In each DCM cycle, the arithmetic and logic unit (ALU) 103 takes the register values and calculates an updated value for the factor k in accordance with equation (11). Then, in each cycle, an updated value for the primary current $i_P$ is sampled and the voltages $V_{COMP}$ and $V_{CREF}$ may be calculated in accordance with equation (13).

The ALU 103, the switches $S_1$ to $S_3$, the timer unit 102, and the registers D3, D2, D1 can be regarded as part of a compensation circuit which is configured to adjust the reference signal $V_{REF}$ dependent on the first, the second, and the third sampled values stored in the registers D3, D2, D1. This adjustment is accomplished upstream of the current mode controller 101 so that the current mode controller 101 receives the adjusted reference signal $V_{CREF}$.

Below, the function of the SMPS circuits described herein is summarized. It should be noted that this is not an exhaustive summary of important features. Instead, emphasis is put on the basic function of the device. Details have already been discussed above with respect to the circuit diagrams shown in FIGS. 1, 2, and 6 and the timing diagrams shown in FIGS. 3, 4, and 5.

The flyback converter circuit includes a transformer, which has a primary winding $L_P$, a secondary winding $L_S$ and an auxiliary winding $L_{AUX}$. During operation, the primary winding $L_P$ carries a primary current $i_P$, the secondary winding carries a secondary current $i_S$, and the auxiliary winding provides a feedback voltage $V_{FB}$. The flyback converter circuit includes a semiconductor switch $T_1$, which is coupled in series to the primary winding for switching a primary current $i_P$ on and off in accordance with a control signal $V_G$. A current measurement circuit is coupled to the semiconductor switch $T_1$ or the transformer for measuring the primary current $i_P$ (current sense signal $V_{CS}$), and a diode $D_1$ is coupled in series to the secondary winding $L_S$ for rectifying the secondary current $i_S$. Moreover, the flyback converter circuit includes a control unit 10, that receives the feedback voltage $V_{FB}$, a reference signal $V_{CREF}$, and the measured primary current $V_{CS}$. Generally, the control unit 10 is configured to generate the control signal $V_G$ for the semiconductor switch $T_1$ dependent (only) on the feedback voltage $V_{FB}$, the reference signal $V_{CREF}$, and the measured primary current $i_P$ (i.e., the current sense signal $V_{CS}$).

Figure 7:
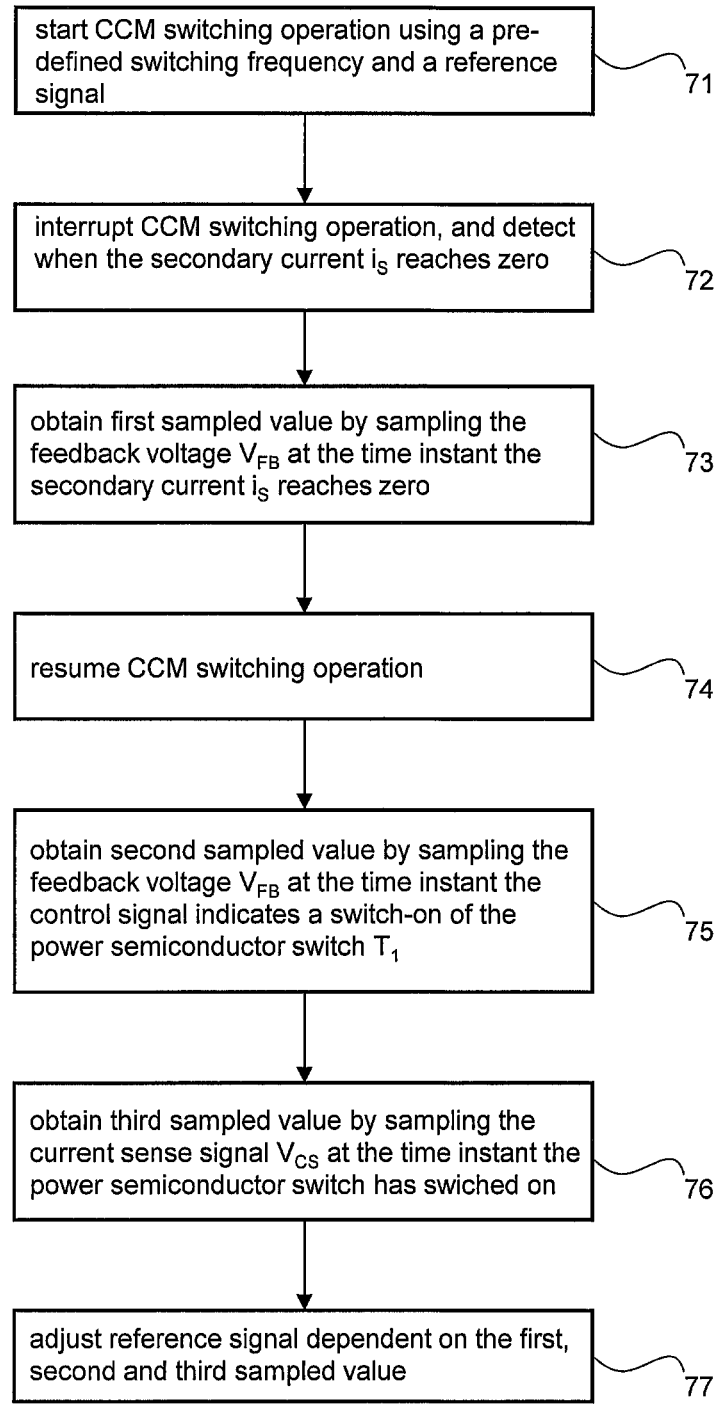
FIG. 7 is a flowchart illustrating the method realized by the circuits of FIGS. 2 and 6.

During CCM operation, the semiconductor switch $T_1$ is switched on and off cyclically (step 71 in FIG. 7). The method for controlling the flyback converter circuit includes (e.g., regularly, from time to time) interrupting the CCM switching operation such that the secondary current $i_S$ is allowed to drop to zero while the semiconductor switch $T_S$ is off (step 72 in FIG. 7). This step also could be regarded as "inserting" a single DCM switching cycle. Then, the feedback voltage $V_{FB}$ is sampled (first sampled value) at the time instant (see FIG. 4, time instant $t_5$) the secondary current $i_S$ reaches zero (step 73 in FIG. 7). The switching operation is then resumed. For example, the semiconductor switch $T_1$ may be switched on when the voltage drop across the switch $T_1$ reaches a minimum. This is the quasi-resonant switch-on condition illustrated in FIG. 4 (see FIG. 4, time instant $t_6$). At this point, CCM operation is resumed (step 74 in FIG. 7). The method further includes sampling (second sampled value, step 75 in FIG. 7) the feedback voltage $V_{FB}$ at the time instant (see FIG. 4, time instant $t_8$) the control signal $V_G$ indicates to switch the semiconductor switch $T_1$ on (i.e., $V_G$ changes from a low level to high level).

Moreover, the current sense signal $V_{CS}$ is sampled (third sampled value, step 76 in FIG. 7) at the time instant (see FIG. 4, time instant $t_8'$) the semiconductor switch $T_1$ has switched on. The time instant $t_8'$ may be detected as the time instant the voltage $V_{AUX}$ has reached the minimum level of $-V_{IN}(N_{AUX}/N_p)$ as illustrated in FIG. 4a, whereas the time instant $t_8$ may be detected as the time instant the drive signal $V_G$ rises from a low level to a high level to switch the transistor $T_1$ on. Having obtained the three sampled values discussed above, the reference signal $V_{CREF}$ is adjusted (step 77 in FIG. 7) dependent on the first, the second, and the third sampled values. This adjusting can also be seen in FIG. 6 where the externally supplied reference signal $V_{REF}$ is superposed with a "compensation signal" $V_{COMP}$ to obtain the compensated reference signal $V_{CREF}$.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even though not explicitly mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A method for controlling a flyback converter that comprises a transformer having a primary winding, a secondary winding and an auxiliary winding, the primary winding operably carrying a primary current, the secondary winding operably carrying a secondary current, and the auxiliary winding operably providing a feedback voltage;

a semiconductor switch coupled in series to the primary winding and configured to switch the primary current on and off in accordance with a control signal, a current measurement circuit coupled to the semiconductor switch or the transformer and configured to measure the primary current, a diode coupled in series with the secondary winding and configured to rectify the secondary current; and a controller coupled to receive the feedback voltage, a reference signal and the measured primary current and configured to generate the control signal for the semiconductor switch dependent on the feedback voltage, the reference signal, and the measured primary current, wherein the semiconductor switch switches on and off cyclically in CCM operation, wherein the method comprises:

regularly interrupting the switching operation such that the secondary current drops to zero while the semiconductor switch is off;

sampling the feedback voltage at the time instant the secondary current reaches zero, thereby obtaining a first sampled value;

resuming the switching operation;

sampling the feedback voltage at the time instant the control signal indicates a switching operation to switch the semiconductor switch on, thereby obtaining a second sampled value;

sampling the measured primary current at the time instant the semiconductor switch has switched on, thereby obtaining a third sampled value; and adjusting the reference signal dependent on the first the second and the third sampled values.

2. The method of claim 1, wherein resuming the operation of a semiconductor switch comprises:

detecting when a voltage drop across the semiconductor switch assumes a minimum; and switching on the semiconductor switch at the time instant the voltage drop across the semiconductor switch assumes the minimum.

3. The method of claim 1, wherein interrupting the operation of the semiconductor switch comprises blanking a feedback signal received by the controller.

4. The method of claim 3, wherein blanking the feedback signal includes using a semiconductor switch to interrupt a signal path of the feedback signal to the controller.

5. The method of claim 1, wherein resuming the operation of a semiconductor switch comprises providing a feedback signal to the controller.

6. The method of claim 1, wherein the controller is configured to generate the control signal for the semiconductor switch such that the flyback converter operates in continuous conduction mode (CCM).

7. A SMPS circuit comprising:

a transformer having a primary winding, a secondary winding, and an auxiliary winding, the primary winding operably carrying a primary current, the secondary winding operably carrying a secondary current, and the auxiliary winding operably providing a feedback voltage;

a semiconductor switch coupled in series to the primary winding for switching the primary current on and off in accordance with a control signal;

a current measurement circuit coupled to the semiconductor switch or the transformer for measuring the primary current;

a diode coupled in series to the secondary winding for rectifying the secondary current;

a controller configured to receive the feedback voltage, a reference signal, and the measured primary current and generate the control signal for the semiconductor switch dependent on the feedback voltage, the reference signal, and the measured primary current, wherein the semiconductor switch is switched on and off cyclically in CCM operation; and a compensation circuit configured to receive the reference signal; regularly interrupt operation of the semiconductor switch such that the secondary current drops to zero while the semiconductor switch is off; sample the feedback voltage at a first time instant to obtain a first sampled value, wherein the first time instant occurs when the secondary current reaches zero; resume the operation of a semiconductor switch; sample the feedback voltage at a second time instant to obtain a second sampled value, wherein the second time instant occurs when the control signal indicates to switch the semiconductor switch on; sample the measured primary current at a third time instant to obtain a third sampled value, wherein the third time instant occurs when the semiconductor switch has switched on; and adjust the reference signal dependent on the first, the second, and the third sampled values upstream of the controller.

8. The SMPS circuit of claim 7, wherein in resuming the operation of a semiconductor switch, the compensation circuit is configured to detect when a voltage drop across the semiconductor switch assumes a minimum and switch on the semiconductor switch at the time instant the voltage drop across the semiconductor switch assumes the minimum.

9. The SMPS circuit of claim 7, wherein the compensation circuit is further configured to blank a feedback signal received by the controller to interrupt the operation of a semiconductor switch.

10. The SMPS circuit of claim 9, wherein the compensation circuit comprises a semiconductor switch configured to interrupt a signal path of the feedback signal to the controller.

11. The SMPS circuit of claim 10, wherein the controller is configured to generate the control signal for the semiconductor switch such that the SMPS circuit operates in continuous conduction mode (CCM).

12. An electronic controller device for controlling a flyback converter, the electronic controller device comprising:

a transformer having a primary winding, a secondary winding, and an auxiliary winding, the primary winding operably carrying a primary current, the secondary winding operably carrying a secondary current, and the auxiliary winding operably providing a feedback voltage;

a power semiconductor switch coupled in series to the primary winding for switching the primary current on and off in accordance with a control signal;

a current measurement circuit coupled to the semiconductor switch or the transformer for measuring the primary current;

a diode coupled in series to the secondary winding for rectifying the secondary current;

a controller configured to receive the feedback voltage, a reference signal, and the measured primary current and generate the control signal for the semiconductor switch dependent on the feedback voltage, the reference signal, and the measured primary current, wherein the semiconductor switch is switched on and off cyclically in CCM operation; and a compensation circuit configured to receive the reference signal; regularly interrupt operation of the semiconductor switch such that the secondary current drops to zero while the semiconductor switch is off; sample the feedback voltage at a first time instant to obtain a first sampled value; resume the operation of the semiconductor switch; sample the feedback voltage at a second time instant to obtain a second sampled value; sample the measured primary current at a third time instant to obtain a third sampled value; and adjust the reference signal dependent on the first, the second, and the third sampled values upstream of the controller.

13. The electronic controller device of claim 12, wherein the first time instant occurs when the secondary current reaches zero.

14. The electronic controller device of claim 12, wherein the second time instant occurs when the control signal indicates to switch the semiconductor switch on.

15. The electronic controller device of claim 12, wherein the third time instant occurs when the semiconductor switch has switched on.

16. A method for controlling a flyback converter, the method comprising:
  interrupting operation of a semiconductor switch that is in series with a primary winding of a transformer of the flyback converter such that a secondary current flowing through a secondary winding of the transformer drops to zero while the semiconductor switch is off, wherein the interrupting occurs at regular intervals;
  sampling a feedback voltage at an auxiliary winding of the transformer at a first time instant to obtain a first sampled value, wherein the first time instant occurs near when the secondary current reaches zero;
  resuming the operation of a semiconductor switch;
  sampling the feedback voltage at a second time instant to obtain a second sampled value, wherein the second time instant occurs when a control signal indicates to switch the semiconductor switch on;
  sampling a primary current in the primary winding at a third time instant to obtain a third sampled value, wherein the third time instant occurs when the semiconductor switch has switched on; and
  adjusting a reference signal dependent on the first, the second, and the third sampled values.

17. The method of claim 16, wherein the flyback converter comprises:
  the transformer having the primary winding, the secondary winding, and the auxiliary winding, the primary winding operably carrying the primary current, the secondary winding operably carrying the secondary current, and the auxiliary winding operably providing the feedback voltage;
  the semiconductor switch that is coupled in series with the primary winding for switching the primary current on and off in accordance with the control signal;
  a current measurement circuit coupled to the semiconductor switch or the transformer for measuring the primary current;
  a diode coupled in series to the secondary winding for rectifying the secondary current; and
  a controller configured to receive the feedback voltage, a reference signal, and the measured primary current and generate the control signal for the semiconductor switch dependent on the feedback voltage, the reference signal, and the measured primary current.

18. The method of claim 16, wherein the semiconductor switch switches on and off cyclically in CCM operation.

19. The method of claim 16, wherein resuming the operation of a semiconductor switch comprises:
  detecting when a voltage drop across the semiconductor switch assumes a minimum; and
  switching on the semiconductor switch at the time instant the voltage drop across the semiconductor switch assumes the minimum.

20. The method of claim 16, wherein interrupting the operation of the semiconductor switch comprises blanking a feedback signal received by the controller.

* * * * *